(12) United States Patent
Mihara

(10) Patent No.: US 10,550,771 B2
(45) Date of Patent: Feb. 4, 2020

(54) CONTROL DEVICE OF INTERNAL-COMBUSTION ENGINE

(71) Applicant: MITSUBISHI JIDOSHA KOGYO KABUSHIKI KAISHA, Tokyo (JP)

(72) Inventor: Noriyuki Mihara, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/940,594

(22) Filed: Mar. 29, 2018

(65) Prior Publication Data
US 2018/0283290 A1    Oct. 4, 2018

(30) Foreign Application Priority Data
Mar. 30, 2017 (JP) ................. 2017-067823

(51) Int. Cl.
*F01L 1/34* (2006.01)
*F02D 13/02* (2006.01)
*F02D 23/00* (2006.01)
*F02D 41/00* (2006.01)

(52) U.S. Cl.
CPC ..... *F02D 13/0261* (2013.01); *F02D 13/0234* (2013.01); *F02D 23/00* (2013.01); *F02D 41/0007* (2013.01); *F01L 1/34* (2013.01); *F02D 2041/001* (2013.01); *F02D 2200/0406* (2013.01); *F02D 2200/101* (2013.01); *F02D 2200/602* (2013.01)

(58) Field of Classification Search
CPC ............. F02D 13/0261; F02D 41/0007; F02D 2041/001; F02D 2200/101; F01L 1/34
USPC ........................................ 123/90.15, 90.17
See application file for complete search history.

(56) References Cited

U.S. PATENT DOCUMENTS 8,375,904 B2 * 2/2013 Gustafson ............ F01L 1/08
123/348
2010/0024785 A1 2/2010 Yoshioka

FOREIGN PATENT DOCUMENTS

| JP | 2008-157057 A | 7/2008 |
| JP | 4277897 B2 | 6/2009 |
| WO | WO 2008/081283 A2 | 7/2008 |

OTHER PUBLICATIONS

Extended European Search Report dated Aug. 16, 2018 issued in counterpart European Application No. 18163086.4.

* cited by examiner

*Primary Examiner* — Ching Chang
(74) *Attorney, Agent, or Firm* — Birch, Stewart, Kolasch & Birch, LLP

(57) ABSTRACT

The setting unit sets a first target valve-opening timing to be set when a load of the internal-combustion engine is within a first range which is a predetermined range later than both a second target valve-opening timing to be set when the load is within a second range in which the load is lower than the first range, and a third target valve-opening timing to be set when the load is within a third range in which the load is higher than the first range.

11 Claims, 3 Drawing Sheets

CONTROL DEVICE OF INTERNAL-COMBUSTION ENGINE

CROSS-REFERENCE TO RELATED APPLICATIONS

This application is based upon and claims the benefit of priority from prior Japanese Patent Application No. 2017-067823, filed Mar. 30, 2017, the entire contents of which are incorporated herein by reference.

BACKGROUND OF THE INVENTION

1. Field of the Invention

The present invention relates to a control device of an internal-combustion engine.

2. Description of the Related Art

Regarding an internal-combustion engine provided with a supercharger, an engine provided with a valve drive mechanism capable of changing the opening/closing timing of an intake valve and exhaust vale, target opening/closing timing setting unit sets the target opening/closing timing of the intake valve and exhaust valve according to the operating condition in a low rotational-speed range of an internal-combustion engine, and control unit controls the valve drive mechanism on the basis of the target opening/closing timing is known. This target opening/closing timing is set in such a manner that an overlap period of the intake valve and exhaust valve provided in the negative pressure region in which the supercharger is not driven is decreased in the medium/low load supercharging region and, furthermore, in the high load supercharging region in which the load requirement is large, the overlap period decreased in the medium/low load supercharging region is increased.

Incidentally, there is sometimes a case where an unusual sound called knocking is caused at the time of operation of an internal-combustion engine. Knocking is a phenomenon in which a metallic hit sound and striking vibration are caused, and is caused by excessively early ignition timing, excessively high compression ratio, excessive boost-up, anti-knock property of fuel, extremely thin air-fuel mixture, and the like. Such an unusual sound may cause a state or the like where the driver is caused to suspect that some trouble has occurred in the internal-combustion engine.

BRIEF SUMMARY OF THE INVENTION

An aspect of the present invention provides a control device of an internal-combustion engine configured to control an internal-combustion engine including at least variable valve timing mechanism adjustably changes a valve-opening timing of an intake valve comprise setting unit sets the target valve-opening timing of the intake valve of the variable valve timing mechanism and variable valve drive control unit operates the variable valve timing mechanism on the basis of the target valve-opening timing set by the setting unit. The setting unit sets a first target valve-opening timing to be set when a load of the internal-combustion engine is within a first range which is a predetermined range later than both a second target valve-opening timing to be set when the load is within a second range in which the load is lower than the first range, and a third target valve-opening timing to be set when the load is within a third range in which the load is higher than the first range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An object of present invention is to provide a control device of an internal-combustion engine capable of reducing the knocking of internal-combustion engine.

Hereinafter, embodiments of the present invention will be described with reference to the accompanying drawings.

First Embodiment

Figure 1:
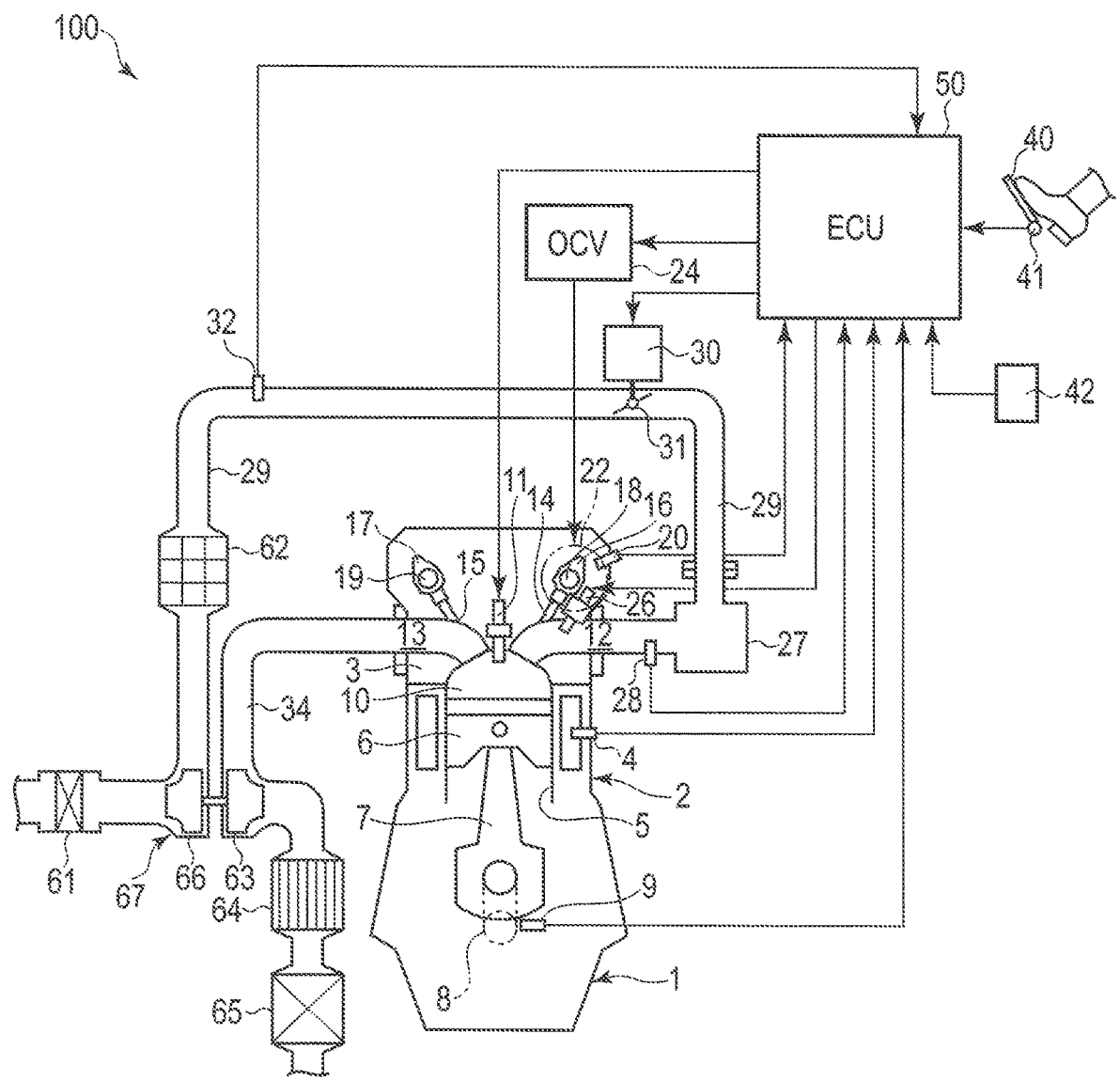
FIG. 1 is a view showing an example of a schematic configuration of a vehicle in which a control device of an internal-combustion engine according to a first embodiment of the present invention is included.

FIG. 1 is a view showing an example of a schematic configuration of a vehicle in which a control device of an internal-combustion engine is included.

As shown in FIG. 1, a vehicle 100 includes an engine (internal-combustion engine) 1, and the engine 1 is a Multi Point Injection (MPI) four-cycle straight four-cylinder gasoline engine. It should be noticed that in FIG. 1, a longitudinal section of one cylinder of the four-cycle straight four-cylinder gasoline engine is shown. It should be noted that the same configuration applies to other cylinders, and hence illustrations and descriptions of the configurations of the other cylinders are omitted. Further, although the vehicle 100 includes other configurations for realizing the functions as a vehicle, these configurations are identical to the conventional art, and hence illustrations and descriptions of these configurations are omitted.

As shown in FIG. 1, the engine 1 is configured in such a manner that a cylinder head 3 is mounted on a cylinder block 2. The cylinder block 2 is provided with a water temperature sensor 4 configured to detect a temperature of cooling water for cooling the engine 1. Inside a cylinder 5 formed in the cylinder block 2, a piston 6 is provided slidably in the vertical direction. The piston 6 is connected to a crankshaft 8 through a connecting rod 7. In the engine 1, a crank angle sensor 9 configured to detect a rotational speed of the engine 1 is provided.

The cylinder head 3, cylinder 5, and piston 6 constitute a combustion chamber 10. The cylinder head 3 is provided with a spark plug 11 facing the combustion chamber 10. In the cylinder head 3, an intake port 12 is formed from the combustion chamber 10 toward one side face of the cylinder head 3, and exhaust port 13 is formed from the combustion chamber 10 toward the other side face of the cylinder head 3.

Further, in the cylinder head 3, an intake valve 14 configured to carry out connection and interdiction between the combustion chamber 10 and intake port 12, and exhaust valve 15 configured to carry out connection and interdiction between the combustion chamber 10 and exhaust port 13 are respectively provided. Furthermore, at an upper part of the cylinder head 3, camshafts 18 and 19 respectively including cams 16 and 17 respectively configured to drive the intake valve 14 and exhaust valve 15 are respectively provided. Further, at the upper part of the cylinder head 3, a cam angle sensor 20 configured to detect a phase of the camshaft 18 is provided.

At one end of the camshaft 18, a variable valve timing mechanism 22 is provided. The variable valve timing mechanism 22 is configured by incorporating, for example, a hydraulic actuator (not shown) in a cam sprocket (not shown) configured to drive the camshaft 18, and by applying/removing actuation hydraulic pressure to/from the hydraulic actuator, it is possible to make the cam rotational phase angle freely lead/lag. Supply/removal of the actuation hydraulic pressure to/from the hydraulic actuator can be carried out by means of, for example, an oil control valve (OCV) 24 provided to the variable valve timing mechanism 22 and, by changing the degree of opening or duty factor of the OCV 24, the amount of the actuation hydraulic pressure to be supplied/removed to/from the hydraulic actuator can be adjusted. Further, the variable valve timing mechanism of the present invention is not limited to the system using the oil control valve 24.

Further, to one side face of the cylinder head 3, an intake manifold 27 is connected to communicate with the intake port 12. The intake manifold 27 is provided with an injector 26 configured to inject fuel into the intake port 12. Further, the intake manifold 27 is provided with an intake pressure sensor 28 configured to detect the intake pressure, and an intake pipe 29 is connected to an intake upstream end of the intake manifold 27.

The intake pipe 29 is provided with an electronic throttle valve (ETV) 30 configured to adjust the intake airflow. The ETV 30 is provided with a throttle position sensor (TPS) 31 configured to detect the degree of opening of the throttle valve.

Further, on the upstream side of the intake pipe 29, an airflow sensor (AFS) 32 configured to detect the intake airflow is provided. On the other hand, to the other side face of the cylinder head 3, an exhaust pipe 34 is connected to communicate with the exhaust port 13.

To an exhaust downstream end of the exhaust pipe 34, an exhaust pipe (not shown) is connected.

Further, the various types of sensors including the aforementioned water temperature sensor 4, crank angle sensor 9, cam angle sensor 20, intake pressure sensor 28, TPS 31, AFS 32, an accelerator position sensor (APS) 41 configured to detect an accelerator position which is an opening degree of the accelerator pedal 40 configured to carry out an acceleration/deceleration operation of the engine 1, vehicle speed sensor 42 configured to detect a vehicle speed of the vehicle 100, and the like are electrically connected to the input side of an electronic control unit (ECU) 50 mounted on the vehicle 100, and detected information items from these sensors are input to the ECU 50. The ECU 50 is a device configured to control the vehicle 100 in an integrating manner, and devices such as an input device, output device, storage device, and the like are included in the ECU 50.

On the other hand, to the output side of the ECU 50, various types of devices such as the aforementioned spark plug 11, OCV 24, injector 26, ETV 30, and the like are electrically connected, and ignition timing, valve timing instruction of the intake valve 14, fuel injection amount, fuel injection timing, throttle position, and the like calculated on the basis of the detected information items from the various types of sensors are output to the various types of devices.

The ECU 50 calculates the rotational speed of the engine from the detected value of the crank angle sensor 9, and sets the valve-opening timing which becomes the target of the intake camshaft 18, i.e., the target valve-opening timing which becomes the target of the operation of the variable valve timing mechanism 22 on the basis of the calculated engine rotational speed and amount of airflow detected by the AFS 32. It should be noted that the method of setting the target valve-opening timing will be described later.

Further, the intake pipe 29 is connected to the intake port 12. The intake pipe 29 is a pathway configured to supply air to the combustion chamber 10, and is constituted of piping and the like. The intake pipe 29 is provided with an air filter 61 configured to clean the air, compressor 66 configured to compress the air, intercooler 62 configured to cool the compressed air, and ETV 30 configured to adjust the flow rate of the air.

The exhaust pipe 34 is connected to the exhaust port 13. The exhaust pipe 34 is a pathway configured to exhaust the exhaust gas from the combustion chamber 10, and is constituted of piping and the like. The exhaust pipe 34 is provided with an exhaust gas turbine 63 to be driven by the exhaust gas, catalyzer 64 configured to clean the exhaust gas, and muffler 65 configured to muffle the sound.

The exhaust gas turbine 63 is coupled to the compressor 66, and the motive power of the exhaust gas turbine 63 driven by the exhaust gas is utilized by the compressor 66 as the motive power for compressing the air. That is, the compressor 66 and exhaust gas turbine 63 constitute a supercharger 67 comprised of an exhaust turbocharger, and the engine 1 is a direct gasoline-injection engine including the supercharger 67. Here, the definitions of supercharging and non-supercharging of the supercharger 67 will be described. A region up to a level at which the supercharger 67 becomes coincident with 0 boost, i.e., coincident with the atmospheric pressure is defined as the non-supercharging region, the region from a point higher than or equal to the 0 boost up to a level at which the supercharger becomes unable to carry out supercharging is defined as the supercharging region, and the region higher than or equal to the supercharging region in which supercharging cannot be carried out is defined as the WOT region. Supercharging/non-supercharging of the supercharger 67 is executed on the basis of control of the ECU 50 (supercharging unit).

Hereinafter, processing of setting the target valve-opening timing of the intake valve 14 to be carried out by the ECU

Figure 2:
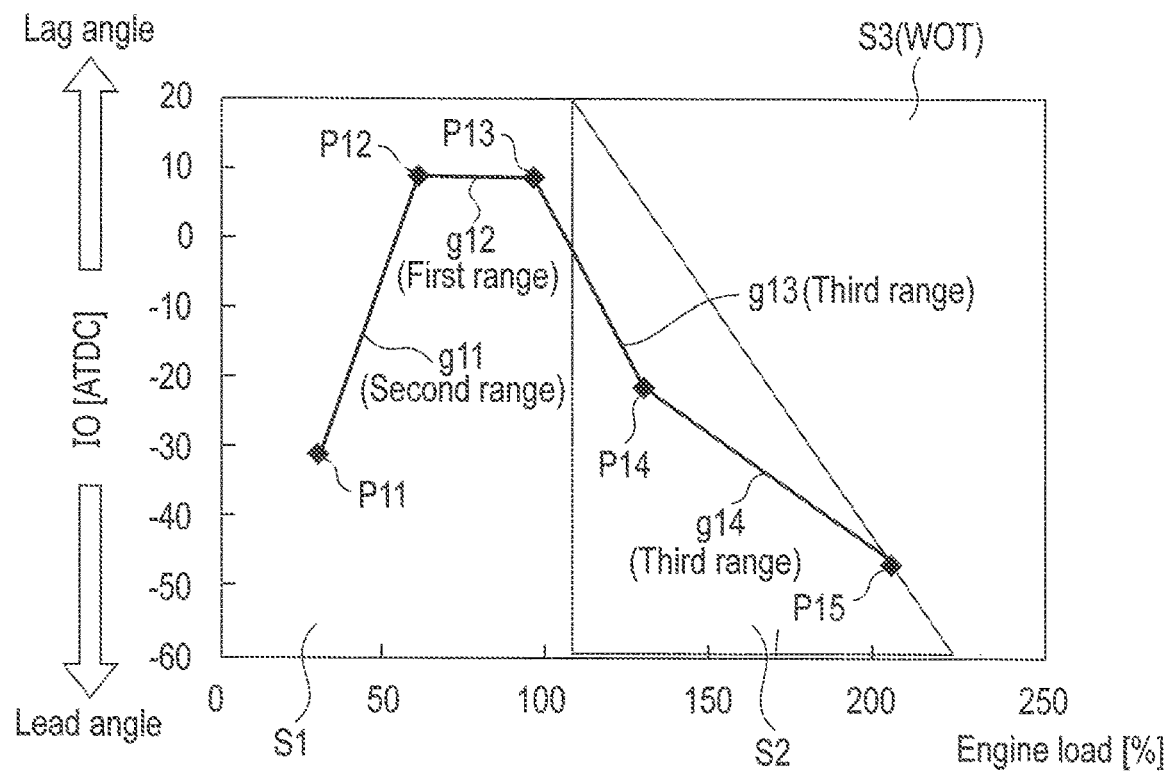
FIG. 2 is a view showing an example of setting of target valve-opening timing to be set according to the characteristics of the internal-combustion engine according to the first embodiment.

50 will be described below. FIG. 2 is a view showing an example of setting of a target valve-opening timing to be set according to the engine load. It should be noticed that setting of the target valve-opening timing according to the engine load is stored in, for example, the storage device in the ECU 50.

In FIG. 2, the axis of abscissas indicates the engine load (%), and axis of ordinates indicates the Intake Open (IO) indicating the timing of opening the intake valve 14 After Top Dead Center (ATDC), i.e., after the top dead point. It should be noted that in the first embodiment, although descriptions are given by taking the case where the engine load of the engine 1 is indicated by the axis of abscissas as an example, other characteristics of the engine 1 may be indicated by the axis of abscissas, for example, the packing efficiency of the engine 1 may be indicated by the axis of abscissas.

Regarding the axis of ordinates, the higher the coordinate, the greater the lag angle of the target valve-opening timing becomes, and the lower the coordinate, the greater the lead angle of the target valve-opening timing becomes. The position at the time when the Intake Open is zero is the position at which the intake valve 14 is closed simultaneously with the timing of the top dead point, the closer the target valve-opening timing to the lag angle side, the later the intake valve 14 is opened, and the closer the target valve-opening timing to the lead angle side, the earlier the intake valve 14 is opened.

The setting region of the target valve-opening timing of FIG. 2 is divided, according to the engine load of the engine 1, into the region S1 in which importance is attached to the fuel consumption of the engine 1, and region S2 in which importance is attached to the output of the engine 1, and the region S2 includes the WOT region S3 in which the supercharger 67 becomes unable to supercharge the engine 1. It should be noted that the region S3 included in the region 2 is a region in which the mass of the intake air is small and the supercharger 67 cannot carry out supercharging, and hence control of setting the target valve-opening timing of the intake valve 14 is not executed. Hereinafter, the regions S1 and S2 will be described below in more detail.

In the region S1, with the object of improving the fuel consumption of the engine 1 by reduction in the pumping loss and prevention of knocking, the target valve-opening timing of the intake valve 14 is set.

Point P11 in the region S1 corresponds to the state where the engine load is about 30%. At point P11, the Intake Open is made to have a lead angle of 30ATDC, whereby overlap is set to such an extent that combustion in the combustion chamber 10 is not deteriorated, and thus the pumping loss is reduced. Point P12 in the region S1 corresponds to the state where the engine load is 50% to about 60%. The range from point P11 to point P12 is set in such a manner that the target valve-opening timing of the intake valve 14 is changed from the lead angle side to the lag angle side with an increase in the engine load as indicated by the graph g11 (second range).

At point P12, the Intake Open is made to have a lag angle of about 10ATDC, whereby the actual compression ratio inside the combustion chamber 10 is reduced and knocking is prevented from occurring. It should be noted that point P12 is a starting end (see graph g12) of a knocking region (first range) in which the target valve-opening timing is held constant. Accordingly, when point P12 is reached, the target valve-opening timing of the intake valve 14 is not made to have a further greater lag angle and is made constant until point P13 as indicated by the graph g12 (first range).

Point P13 corresponds to the state where the engine load is slightly less than 100%. Point P13 is a termination end of the knocking region. Setting of point P13 can arbitrarily be carried out according to the type of vehicle or engine.

In the region S2, the required amount of air specified by the driver is realized, and the target valve-opening timing of the intake valve 14 for improving the output of the engine 1 is set, whereby control of the amount of air at the throttle valve or waste-gate valve and setting of the target valve-opening timing of the intake valve 14 are linked to each other, and thus improvement in the output of the engine 1 is realized.

Point P14 in the region S2 corresponds to the state where the engine load is about 120%. At point P14, the required amount of air specified by the driver is realized and efforts are made to realize improvement in the output of the engine 1, and the target valve-opening timing of the intake valve 14 for improving the fuel consumption is set while knocking is being prevented from occurring by reducing the actual compression ratio inside the combustion chamber 10. Accordingly, the range from aforementioned point P13 to point P14 is set in such a manner that the target valve-opening timing of the intake valve 14 is changed from the lag angle side to the lead angle side with an increase in the engine load as indicated by the graph g13 (third range).

Point P15 corresponds to the state where the engine load is about 200%. At point P15, the throttle valve is fully opened, whereby the maximum amount of air is realized and the output is improved. Point P15 is set at a border between the region S2 and region S3. The range from point P14 to point P15 is set in such a manner that the target valve-opening timing of the intake valve 14 is changed from the lag angle side to the lead angle side with an increase in the engine load as indicated by the graph g14 (third range).

As described above, in the first embodiment, the configuration is contrived in such a manner that setting of the target valve-opening timing of the intake valve 14 indicated by the graphs g13 and g14 is made on the left side of the border line between the region S2 and region S3, i.e., on the region S1 side on which importance is attached to the fuel consumption, whereby the fuel consumption of the engine 1 is further improved.

Figure 3:
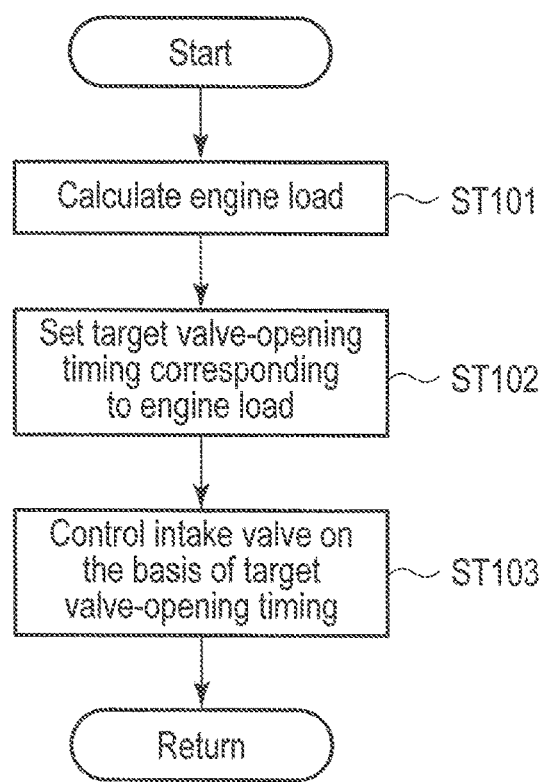
FIG. 3 is a flowchart showing an example of setting processing of the target valve-opening timing according to the first embodiment.

Next, control of setting the target valve-opening timing of the intake valve 14 of the engine 1 configured as described above will be described below. FIG. 3 is a flowchart showing an example of processing of setting the target valve-opening timing of the intake valve 14 to be executed by the ECU 50. This processing is executed while the engine 1 is operated.

As shown in FIG. 3, the ECU 50 calculates the engine load (ST101). The ECU 50 calculates the engine load on the basis of, for example, the degree of opening of the throttle valve (throttle position). Next, the ECU 50 sets the target valve-opening timing of the intake valve 14 corresponding to the calculated engine load (ST102: setting unit). The ECU 50 sets the target valve-opening timing of the intake valve 14 corresponding to the calculated engine load on the basis of FIG. 2 already described above.

Next, the ECU 50 controls the variable valve timing mechanism 22 to thereby control opening/closing of the intake valve 14 so that the set target valve-opening timing can be realized (ST103: variable valve timing control unit). Then, the processing is moved to the return position.

Figure 4:
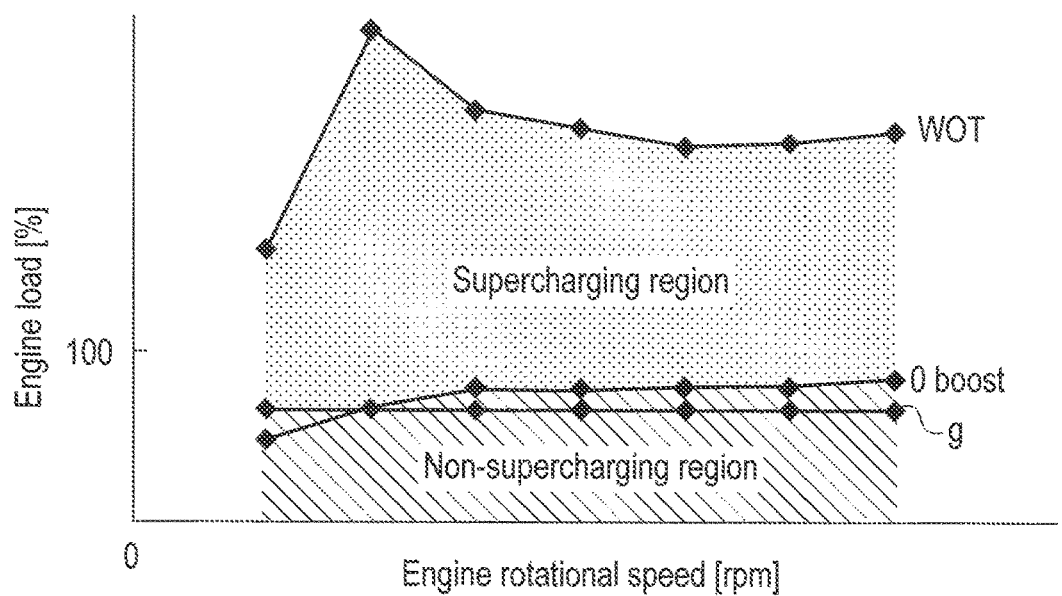
FIG. 4 is a view for comparing a case where setting of the target valve-opening timing is carried out in the same manner as the first embodiment and case where setting of the target valve-opening timing is carried out in the same manner as the conventional art with each other.

Next, a comparison between the case where setting of the target valve-opening timing of the intake valve 14 is carried out in the same manner as the first embodiment and case where setting of the target valve-opening timing of the intake valve 14 is carried out in the same manner as the conventional art on the basis of whether the supercharger 67 is in the non-supercharging region or in the supercharging region will be described below. FIG. 4 is a view showing an example of the comparison between the cases. It should be noted that in FIG. 4, the axis of ordinates indicates the engine load, and axis of abscissas indicates the rotational speed of the engine 1.

Heretofore, it is specified that whether the supercharger 67 is in the non-supercharging region or in the supercharging region should be determined on the basis of whether or not the supercharger 67 is in the 0 boost state. Accordingly, as shown in FIG. 4, the non-supercharging region and supercharging region are separated from each other with 0 boost used as the criterion. Accordingly, when the target valve-opening timing of the intake valve 14 is to be set on the basis of whether the supercharger is in the non-supercharging region or in the supercharging region, setting of the target valve-opening timing becomes coincident with 0 boost.

However, in the first embodiment, the target valve-opening timing is set on the basis of whether importance should be attached to the fuel consumption of the engine 1 (region S1) or importance should be attached to the output (region S2) as indicated by the graphs g, and hence it is made possible to set the target valve-opening timing of the intake valve 14 regardless of whether the supercharging of the supercharger 67 is in the non-supercharging region or in the supercharging region.

As described above, the ECU 50 can set the target valve-opening timing of the intake valve 14 regardless of whether the supercharging of the supercharger 67 is in the non-supercharging region or in the supercharging region. Accordingly, when the engine 1 is operated at a low rotational speed with a low load, it is possible for the ECU 50 to make the vehicle 100 run with low fuel consumption even in the supercharging region. Furthermore, the ECU 50 carries out setting of the target valve-opening timing of the intake valve 14 in such a manner as to shift the setting from the border line between the region S2 and region S3 toward the region S1 side where importance is attached to fuel consumption (see graphs g13 and g14 in FIG. 2), and hence it is possible to further improve the fuel consumption of the engine 1.

As described above, the ECU 50 sets the target valve-opening timing (first target valve-opening timing) to be set when the load of the engine 1 is within the range (first range) from point P12 to point P13 later than both the target valve-opening timing (second target valve-opening timing) to be set when the load of the engine 1 is within the range (second range) from point P11 to point P12 in which the load is lower than the first range, and target valve-opening timing (third target valve-opening timing) to be set when the load of the engine 1 is within the range (third range) from point P13 to point P15 in which the load is higher than the first range as shown in FIG. 2. Accordingly, in the first range, it is possible to reduce the actual compression ratio, and prevent knocking from occurring.

Further, as indicated by the graph g11, in the second range, the ECU 50 sets the target valve-opening timing (second target valve-opening timing) in such a manner as to make the target valve-opening timing (second target valve-opening timing) later with an increase in the load of the engine 1.

Further, as indicated by the graph g13 and g14, in the third range, the ECU 50 sets the target valve-opening timing (third target valve-opening timing) in such a manner as to make the target valve-opening timing (third target valve-opening timing) earlier with an increase in the load of the engine 1.

Further, the third range includes the range of the load in which supercharging is carried out by the supercharger 67. Furthermore, when the load is the maximum load in the third range, the ECU 50 sets the target valve-opening timing to point P15 which is the latest timing among the valve-opening timings at which supercharging to be carried out by the supercharger 67 can be realized.

Further, in the second range, the ECU 50 sets the valve-opening timing of the intake valve 14 in such a manner as to provide a valve overlap period in which the exhaust valve 15 and intake valve 14 are simultaneously in the opened state.

Further, the first range is a range of the load in which there is a possibility of the engine 1 causing abnormal combustion, and is set variable according to the rotational speed of the engine 1.

Furthermore, as indicated by the graph g12, the ECU 50 holds the target valve-opening timing (first target valve-opening timing) to be set when the load of the engine 1 is within the first range at a constant valve-opening timing.

As described above, the ECU 50 can set an appropriate target valve-opening timing according to the magnitude of the load of the engine 1.

Second Embodiment

What makes a second embodiment differ from the first embodiment already described above is associated with setting of the target valve-opening timing of the intake valve 14. Accordingly, setting of the target valve-opening timing of the intake valve 14 will be described below in detail. It should be noted that configurations identical to the first embodiment are denoted by reference symbols identical to the first embodiment, and their detailed descriptions are omitted.

Figure 5:
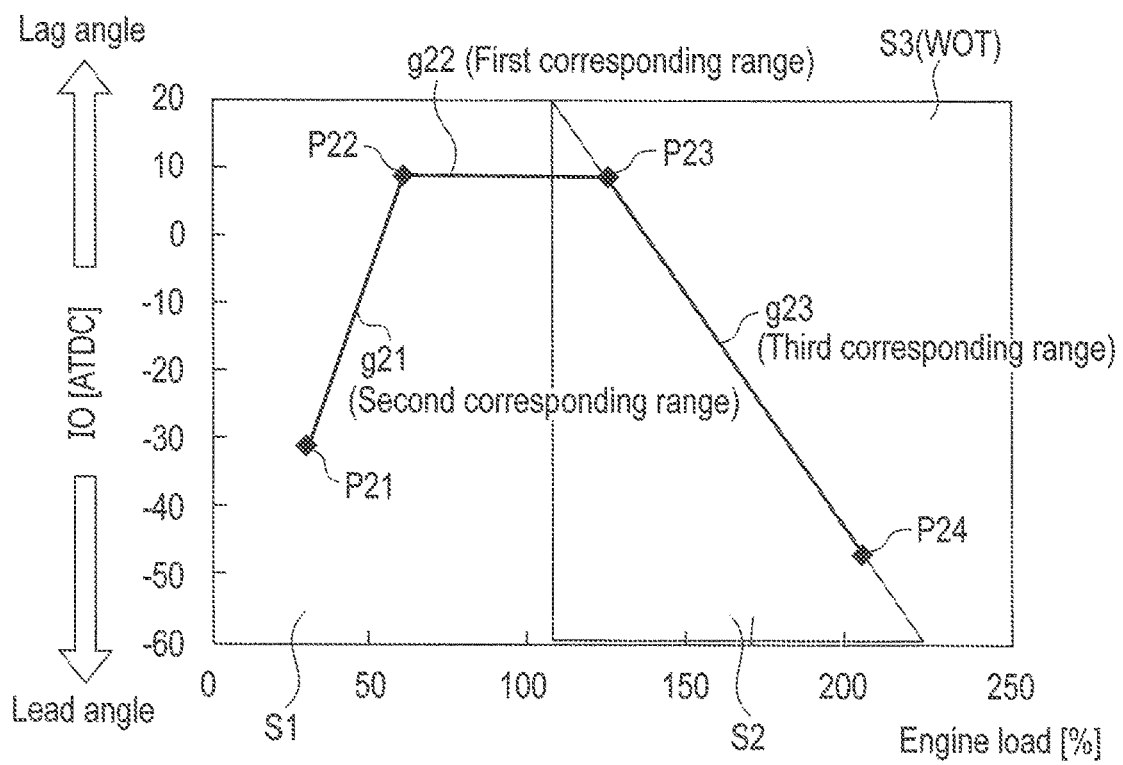
FIG. 5 is a view showing an example of setting of the target valve-opening timing to be set according to the characteristics of the internal-combustion engine according to a second embodiment of the present invention.

FIG. 5 is a view showing an example of setting of the target valve-opening timing to be set in accordance with the engine load according to a second embodiment. As shown in FIG. 5, a range (hereinafter referred to as a first corresponding range) corresponding to the first range is formed in the range from point P22 in the region S1 to P23 greater than point P22 and located at a border between the region S2 and region S3.

When compared with the first embodiment, in the first embodiment, although when the first range is passed, the target valve-opening timing of the intake valve 14 is set in such a manner as to be shifted toward the region S1 side where importance is attached to fuel consumption and is changed from the lag angle side to the lead angle side with an increase in the engine load (see graphs g13 and g14 in FIG. 2), in the second embodiment, when the first corresponding range is passed, the target valve-opening timing of the intake valve 14 is shifted to this side of the border between the region S2 in which importance is attached to output and region S3 of WOT, more specifically, the target valve-opening timing of the intake valve 14 is set in such a manner as to be changed from the lag angle side to the lead angle side with an increase in the engine load from point P23 to point P24 both of which are positioned on the border line (see graph g23 of FIG. 5).

Also by the configuration described above, it is possible for the ECU 50 to set the target valve-opening timing of the intake valve 14 regardless of whether the supercharging of the supercharger 67 is in the non-supercharging region or in the supercharging region. Accordingly, it is identical to the first embodiment that when the engine 1 is operated at a low rotational speed with a low load, it becomes possible for the ECU 50 to make the vehicle 100 run with low fuel consumption even in the supercharging region.

It should be noted that in the engine 1, in the low-load region such as the idle state or the like, in order to improve the start-up performance, the target valve-opening timing of the intake valve 14 is set to the largest lag angle side, and the target valve-opening timing is gradually changed to the lead angle side with an increase in the load. Thereafter, transition to the second range (region of lower load than the knocking region) is made and, then the target valve-opening timing is set closer to the lag angle side with an increase in the load until an entry into the first range (knocking region) is made. Accordingly, in the first or second embodiment described above, the ECU 50 may set a target valve-opening timing (fourth target valve-opening timing) to be set when the load of the engine 1 is within a range (low-load region: fourth range) lower than or equal to point P11 that is a range in which the load is lower than the second range, or to be set when the load of the engine 1 is within a range (low-load region: fourth corresponding range) lower than or equal to point P21 later than the first target valve-opening timing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control device of an internal-combustion engine configured to control an internal-combustion engine including a variable valve timing mechanism that adjustably changes a valve-opening timing of an intake valve comprising:
 a controller that:
  sets a target valve-opening timing of the intake valve of the variable valve timing mechanism; and
  operates the variable valve timing mechanism on the basis of the target valve-opening timing set in the setting step,
 wherein the setting step sets a first target valve-opening timing to be set when a load of the internal-combustion engine is within a first range between a lower end and a higher end of the load that causes an abnormal combustion which is later than both a second target valve-opening timing to be set when the load is within a second range in which the load is lower than the lower end, and a third target valve-opening timing to be set when the load is within a third range in which the load is higher than the higher end.

2. The control device of an internal-combustion engine according to claim 1, wherein
 the controller sets the second target valve-opening timing later with an increase in the load of the internal-combustion engine.

3. The control device of an internal-combustion engine according to claim 1, wherein
 the controller sets the third target valve-opening timing earlier with an increase in the load of the internal-combustion engine.

4. The control device of an internal-combustion engine according to claim 1, wherein the internal-combustion engine includes a supercharger, and
the third range includes a range of a load in which the engine is supercharged by the supercharger.

5. The control device of an internal-combustion engine according to claim 4, wherein
 when the load is a maximum load in the third range, the controller sets the target valve-opening timing to the latest timing among valve-opening timings at which supercharging to be carried out by the supercharger is realizable.

6. The control device of an internal-combustion engine according to claim 1, wherein
 the internal-combustion engine further includes an exhaust valve, and
 in the second range, the controller sets the valve-opening timing of the intake valve in such a manner as to provide a valve overlap period in which the exhaust valve and the intake valve are simultaneously in an opened state.

7. The control device of an internal-combustion engine according to claim 1, wherein
 the first range is a range of the load in which an abnormal combustion occurs, and is set variable according to a rotational speed of the internal-combustion engine.

8. The control device of an internal-combustion engine according to claim 1, wherein
 the controller holds the first target valve-opening timing at a constant valve-opening timing.

9. The control device of an internal-combustion engine according to claim 1, wherein
 the controller sets a fourth target valve-opening timing to be set when the internal-combustion engine is in an idle state and the load is within a fourth range that is lower than the load in the second range, the fourth target valve opening being set later than the first target valve-opening timing.

10. A control device of an internal-combustion engine configured to control an internal-combustion engine including a variable valve timing mechanism that adjustably changes a valve-opening timing of an intake valve comprising:
 a controller that:
  sets a target valve-opening timing of the intake valve of the variable valve timing mechanism; and
  operates the variable valve timing mechanism on the basis of the target valve-opening timing set in the setting step,
 wherein the setting step sets a first target valve-opening timing to be set when a load of the internal-combustion engine is within a first range which is a predetermined range later than both a second target valve-opening timing to be set when the load is within a second range in which the load is lower than the first range, and a third target valve-opening timing to be set when the load is within a third range in which the load is higher than the first range, and
 the controller:
  sets the second target valve-opening timing later with an increase in the load of the internal-combustion engine,
  sets the third target valve-opening timing earlier with an increase in the load of the internal-combustion engine, and
  holds the first target valve-opening timing at a constant valve-opening timing.

11. A control device of an internal-combustion engine configured to control an internal-combustion engine including a variable valve timing mechanism that adjustably changes a valve-opening timing of an intake valve comprising:
a controller that:
sets a target valve-opening timing of the intake valve of the variable valve timing mechanism; and
operates the variable valve timing mechanism on the basis of the target valve-opening timing set in the setting step,
wherein the setting step sets a first target valve-opening timing to be set when a load of the internal-combustion engine is within a first range between a lower end and a higher end of the load that causes an abnormal combustion which is later than both a second target valve-opening timing to be set when the load is within a second range in which the load is lower than the lower end, and a third target valve-opening timing to be set when the load is within a third range in which the load is higher than the higher end, and
the controller:
sets the second target valve-opening timing later with an increase in the load of the internal-combustion engine,
sets the third target valve-opening timing earlier with an increase in the load of the internal-combustion engine,
holds the first target valve-opening timing at a constant valve-opening timing, and
sets a fourth target valve-opening timing to be set when the internal-combustion engine is in an idle state and the load is within a fourth range that is lower than the load in the second range, the fourth target valve opening being set later than the first target valve-opening timing.

\* \* \* \* \*